(No Model.)
G. McKAY & H. P. FAIRFIELD.
Nailing Machine for Boots and Shoes.
No. 239,395.    Patented March 29, 1881.
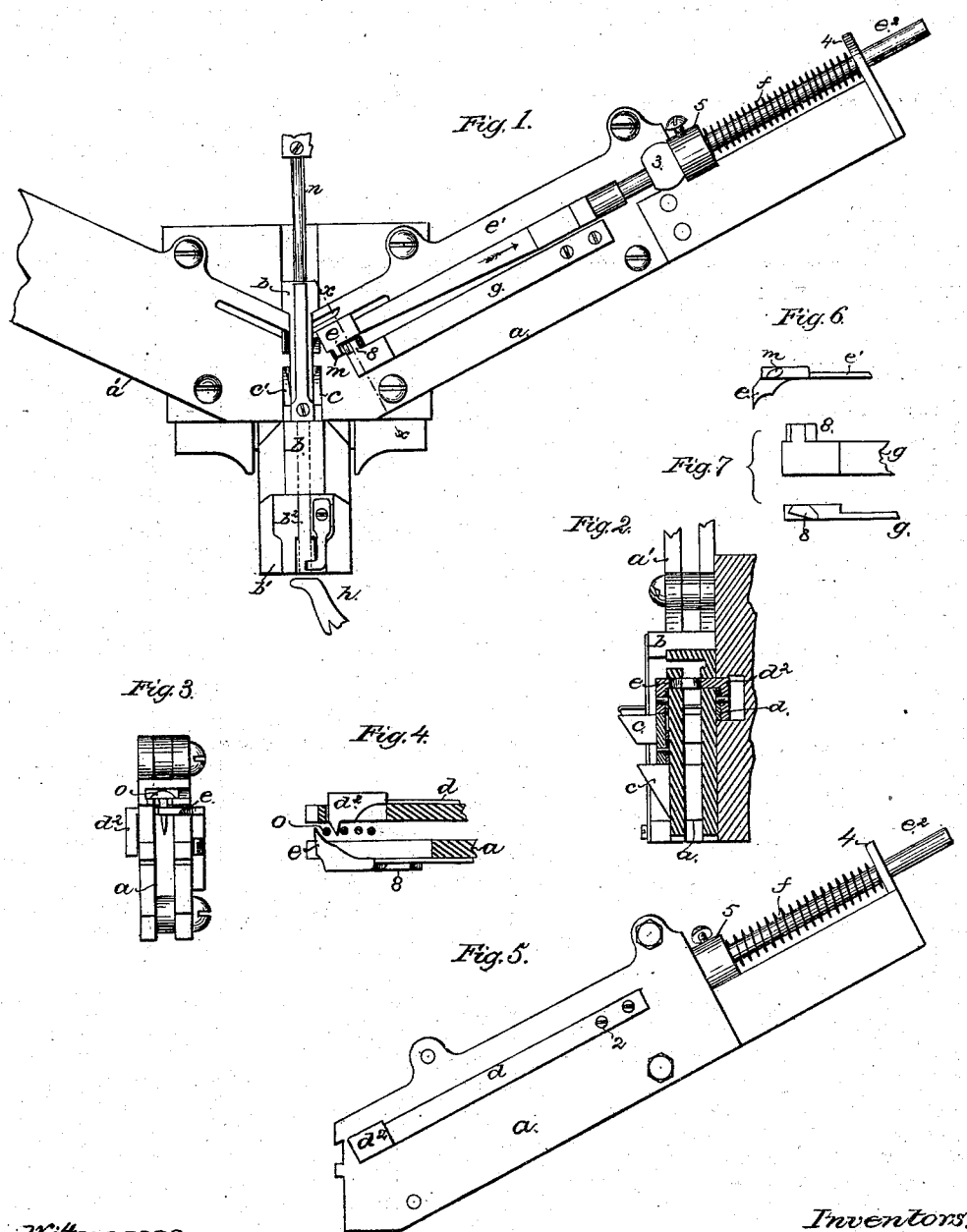

United States Patent Office.

GORDON McKAY, OF CAMBRIDGE, AND HADLEY P. FAIRFIELD, OF WEST MEDFORD, MASSACHUSETTS.

NAILING-MACHINE FOR BOOTS AND SHOES.

SPECIFICATION forming part of Letters Patent No. 239,395, dated March 29, 1881.

Application filed February 21, 1881. (No model.)

*To all whom it may concern:*

Be it known that we, GORDON MCKAY, of Cambridge, and HADLEY P. FAIRFIELD, of West Medford, county of Middlesex, State of Massachusetts, have invented Improvements in Nailing-Machines for Boots and Shoes, of which the following description, in connection with the accompanying drawings, is a specification.

This invention in nailing-machines has for its object certain improvements in that part of the mechanism for intermittingly separating the endmost nail from the end of a row of nails suspended in a raceway preparatory to driving the said nail by the usual nail-driver into the stock.

This invention is an improvement on United States Patent No. 236,568, dated January 11, 1881. That patent describes two diametrically-opposite raceways in which headed nails are suspended, and two separators, one at the end of and co-operating with the ends of each of the said raceways, to open and close them at the proper times. That patent describes the employment of a pusher between the ends of the raceways, by which to push forward under the nail-driver and into the rear side of the driver-passage the nail just separated from the raceway and next to be driven. In this application the two opposed raceways are directly opposite the driver-passage, thus enabling us to dispense with the pusher referred to; and in addition to the separators, which at the proper times open and close the ends of raceways to permit the passage of a single nail into the driver-passage, we employ a reciprocating nail-feeder and nail-detainer, which co-operate together, the former to engage and feed forward the endmost nail next to be driven, while the latter holds the nail next at the rear of it and all back of that nail. The feeder for the endmost nail, when moved backward, rides over a wedge-block, which draws the feeder out from the raceway, so as to pass the nail next behind the detainer, and then the feeder drops immediately behind the said nail. The feeder, during its forward movement, passes under the said wedge-block, the latter being supported in a yielding manner, and remains within the raceway at the rear of the endmost nail in the raceway, and pushes or feeds it along to be driven, the nail so pushed by the feeder against the nail-detainer in front of it (the latter having an inclined face) acting to push the detainer back from the raceway to permit the endmost nail to pass it, after which the detainer immediately drops behind the nail engaged by the feeder, and between it and the next nail at the rear of it, the detainer holding the nail behind it and the nails in the raceway next to it from sliding down in the race beyond the detainer.

Figure 1 represents, in front view, a sufficient portion of a nailing-machine, taken in connection with the United States Patent No. 236,568, to illustrate our invention. Fig. 2 is a partial section thereof on the dotted line $xx$. Fig. 3 is a view of the delivery end of one of the raceways. Fig. 4 is a top view thereof, the upper edges of the raceway being broken away to show the detainer and nail-feeder; Fig. 5, a partial rear side elevation of one of the raceways; Fig. 6, an under-side view of the forward end of the nail-feeder, showing its heel; and Fig. 7, a side and top view of the wedge-block against which the said heel strikes as the feeder is reciprocated, to draw the feeder from the raceway at its back-stroke and permit it to remain in the raceway when feeding a nail forward.

The two raceways $a$ $a'$ are suitably shaped at top to guide and sustain the nails $o$ by their heads. That part of the driver-passage or nail-tube $b$ in which the usual nail-driver $n$, but partially shown, will descend, (it being operated in any usual manner common in nailing-machines,) is located between the ends of the raceways $a$ $a'$, and the driver-passage is open at each side, instead of at its rear.

The separators $c$ $c'$, which close or open the passages between the raceways and the nail-driver passage, are alike, and may be supposed to be actuated as in the patent hereinbefore referred to, or in any usual manner.

The nose $b'$, which will rest on the stock, and out from below which the nails will be driven into the stock or material, will have any usual nail-centering jaws $b^2$. We may support the stock in any usual way; but we shall preferably support it on an ordinary horn, the upper end only of which is shown at $h$; but instead of the horn we may employ any usual support.

The rear of the raceway has connected with it at 2 a spring-arm, $d$, at the forward end of which is the detainer $d^2$, it being a bevel-faced finger extended through a slot at the rear side of the raceway, just below the portion thereof on which the under sides of the heads of the nails bear and travel. This detainer, acting in front of a nail, will prevent it from traveling down in the raceway by reason of gravity alone. The edge of the detainer next the nail held by it is beveled downward toward the end of the raceway, and is also made wedging, so that when the nail-feeder, to be hereinafter described, pushes a nail against it the detainer will be forced back and out from the raceway, thus permitting the said nail to pass the detainer, and having passed the latter, the detainer, by reason of the spring-arm $d$, is quickly thrown into the raceway at the rear of the nail being acted upon by the nail-feeder.

The nail-feeder $e$ is composed of a finger or prong at the end of a spring-arm, $e'$, connected with a slide-rod, $e^2$, held in suitable bearings 3 4, and reciprocated in any proper way. The rod $e^2$ is surrounded by a collar, 5, and an adjustable spring, $f$, the latter moving the slide and detent in one direction. The nail-feeder is projected through a slot in the outer wall of the raceway, so as to engage a nail below its head. Secured to the raceway is a spring, $g$, having at its free end a lozenge or wedge shaped block, 8, against which the heel $m$ of the nail-feeder strikes in its forward and backward movements, the said heel $m$ passing behind the block 8 as the feeder is moved forward with a nail, and riding up over the block 8 when the nail-feeder is moved from its position, Fig. 1, backward in the direction of the arrow, Fig. 1, the heel so riding over the block 8 causing the pronged part of the nail-feeder to be drawn out laterally from the raceway and from the path of the nail at the rear of it. As soon as the heel $m$ passes the block $c$ the spring $g$ causes the pronged part of the feeder to again enter the raceway at the rear of the endmost nail, and between it and the next nail at the rear of it.

The raceway $a'$ will, in practice, have applied to it a nail-feeder, nail-detainer, and wedge-block, and parts such as attached to raceway $a$.

We claim—

1. In a nailing-machine, the raceway, the nail-detainer, and the nail-feeding device and wedge-block co-operating therewith, the nail-feeder being adapted to feed the nail past the detainer, and then to pass over and behind the nail at the rear of the detainer preparatory to feeding a nail forward into the driver or nail-tube passage, substantially as described.

2. The open-sided driver-passage in which the nail-driver works, two raceways directly opposite side openings made in the said driver-passage to permit the nails to pass therein laterally directly from the raceways, and separators located between the ends of the raceways and the lateral openings in the driver-passage, substantially as described.

3. The open-sided driver-passage in which the nail-driver works, two raceways directly opposite side openings made in the said driver-passage to permit the nails to pass therein laterally directly from the raceways, and separators located between the ends of the said raceways, and the lateral openings in the driver-passage, combined with the yielding or spring-supported nail-feeders to force the nails from the raceways into the driver-passage when the separators are withdrawn, substantially as described.

4. The slotted raceway to support a series of nails by their heads, the yielding nail-detainer, and the yielding nail-feeder, combined with the yielding block 8, to enable the feeder, as it is being moved backward, to pass over a nail held by the detainer, substantially as described.

GORDON McKAY.
HADLEY P. FAIRFIELD.

Witnesses:
G. W. GREGORY,
A. REYNOLDS.